United States Patent
Bales et al.

(10) Patent No.: US 9,479,927 B1
(45) Date of Patent: Oct. 25, 2016

(54) WIRELESS COMMUNICATION SYSTEM TO PROVIDE CALL ROUTING WHEN CONNECTION TO A CORE NETWORK IS LOST

(71) Applicant: Sprint Communications Company L.P., Overland Park, KS (US)

(72) Inventors: Stephen R. Bales, Lee's Summit, MO (US); Maneesh Gauba, Overland Park, KS (US); Dwight Edward Patton, Olathe, KS (US); Cary Carnell Truley, Sr., Apopka, FL (US)

(73) Assignee: Sprint Communications Company L.P., Overland Park, KS (US)

(*) Notice: Subject to any disclaimer, the term of this patent is extended or adjusted under 35 U.S.C. 154(b) by 89 days.

(21) Appl. No.: 14/609,740

(22) Filed: Jan. 30, 2015

(51) Int. Cl.
*H04W 8/30* (2009.01)
*H04W 40/24* (2009.01)
*H04W 8/24* (2009.01)
*H04W 40/28* (2009.01)

(52) U.S. Cl.
CPC .............. *H04W 8/30* (2013.01); *H04W 8/24* (2013.01); *H04W 40/248* (2013.01); *H04W 40/28* (2013.01)

(58) Field of Classification Search
CPC ..... H04W 8/24; H04W 8/30; H04W 40/248; H04W 24/04
See application file for complete search history.

(56) References Cited

U.S. PATENT DOCUMENTS

| | | | |
|---|---|---|---|
| 7,113,500 B1 | 9/2006 | Bollinger et al. | |
| 7,283,519 B2 | 10/2007 | Girard | |
| 8,184,528 B2 * | 5/2012 | Parker | H04W 24/04 370/225 |
| 8,351,326 B2 * | 1/2013 | Parker | H04W 24/04 370/225 |
| 9,078,157 B2 * | 7/2015 | Chiang | H04W 24/04 |
| 9,264,971 B2 * | 2/2016 | Wilkinson | H04L 45/54 |
| 2001/0034228 A1 * | 10/2001 | Lehtovirta | H04W 24/00 455/424 |
| 2004/0071090 A1 * | 4/2004 | Corson | G06F 11/0709 370/244 |
| 2012/0182862 A1 * | 7/2012 | Cirkovic | H04L 41/0654 370/220 |
| 2012/0225655 A1 * | 9/2012 | Son | H04W 36/0055 455/436 |
| 2015/0341251 A1 * | 11/2015 | Kogan | H04W 24/04 370/244 |

* cited by examiner

*Primary Examiner* — Albert T Chou

(57) ABSTRACT

A wireless communication system provides call routing when the connection to a core network is lost. A base station wirelessly exchanges data packets associated with one or more communication sessions with one or more wireless communication devices. An Internet Protocol (IP) router scans the data packets to identify active users on the base station. The IP router generates a database of the active users. The IP router detects a loss of connection to the core network and determines which of the communication sessions can be maintained based on the database of active users. The IP router routes the data packets for the communication sessions that can be maintained back to the base station for delivery.

20 Claims, 7 Drawing Sheets

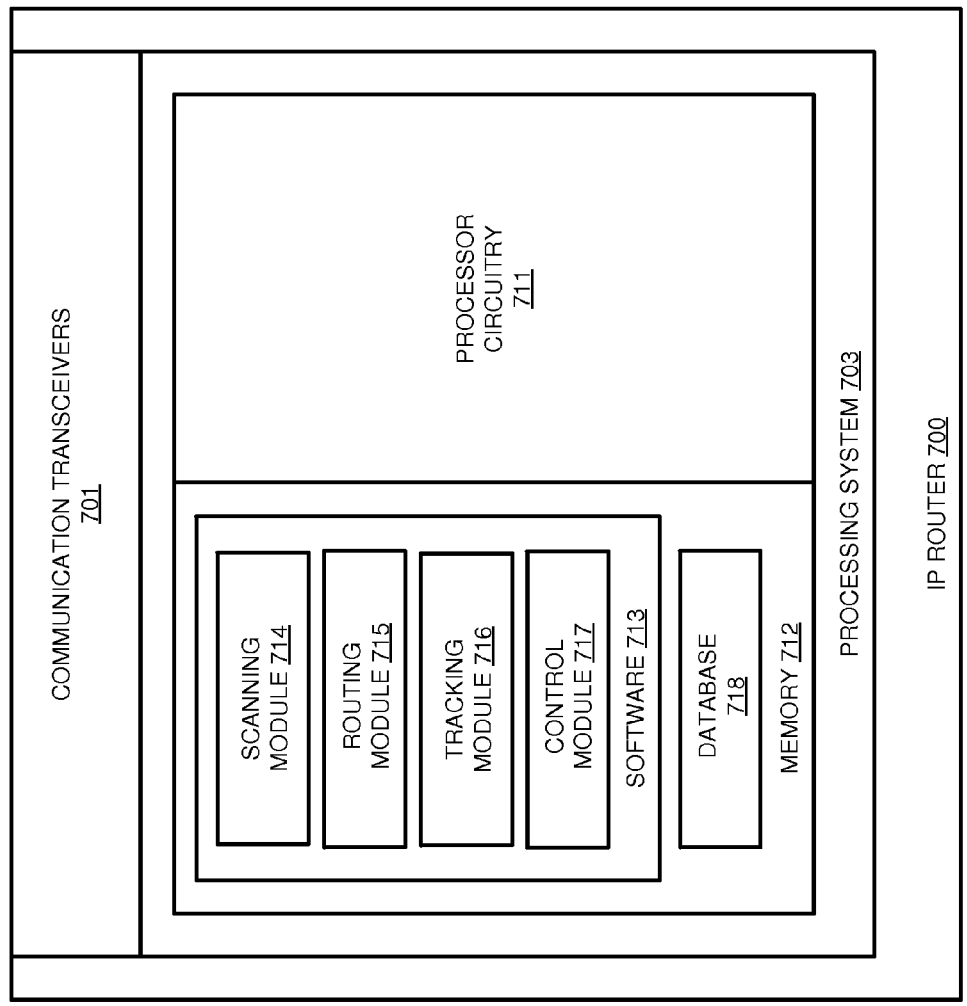

WIRELESS COMMUNICATION SYSTEM TO PROVIDE CALL ROUTING WHEN CONNECTION TO A CORE NETWORK IS LOST

TECHNICAL BACKGROUND

Wireless communications have become increasingly prominent for sending and receiving information. For example, individuals may utilize a wireless communication device for voice communications, video calls, text messaging, email, research, entertainment, and/or for conducting critical business transactions. Wireless communication devices may use wireless protocols, such as Long Term Evolution (LTE), Evolution Data Optimized (EVDO), Code Division Multiple Access (CDMA), Global System for Mobile communications (GSM), High Speed Packet Access (HSPA), and the like to communicate over wireless communication networks.

Wireless communication networks comprise a collection of wireless access nodes connected together with communication links. A wireless communication network may also be connected to other communication networks. Wireless communication systems, such as cellular voice and data networks, typically include multiple wireless access nodes spread over a geographic area through which wireless communication devices can register and receive wireless access to wireless communication services. Wireless access nodes communicate with wireless communication devices.

In addition to wireless access nodes and wireless communication devices, wireless communication systems also include routers, such as Internet Protocol (IP) routers. The IP routers route communications between the wireless access nodes and the rest of the wireless communication network.

Overview

Examples disclosed herein provide a system, method, hardware, and software to provide call routing when connection to a core network is lost. In one instance, the method includes a base station that wirelessly exchanges data packets associated with one or more communication sessions with one or more wireless communication devices. The method further includes an Internet Protocol (IP) router that scans the data packets to identify active users on the base station and generates a database of the active users. The method includes the IP router detecting a loss of connection to the core network and determining which of the communication sessions can be maintained based on the database of active users. The method further includes the IP router routing the data packets for the communication sessions that can be maintained back to the base station for delivery.

In another example, a wireless communication system provides call routing when connection to a core network is lost. The wireless communication system includes a base station and an Internet Protocol (IP) router. The base station wirelessly exchanges data packets associated with one or more communication sessions. The IP router scans the data packets to identify active users on the base station and generates a database of the active users. The IP router detects a loss of connection to the core network and determines which of the communication sessions can be maintained based on the database of active users. The IP router routes the data packets for the communication sessions that can be maintained back to the base station for delivery.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 7 illustrates an example of Internet Protocol router to provide call routing when connection to the core network is lost.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
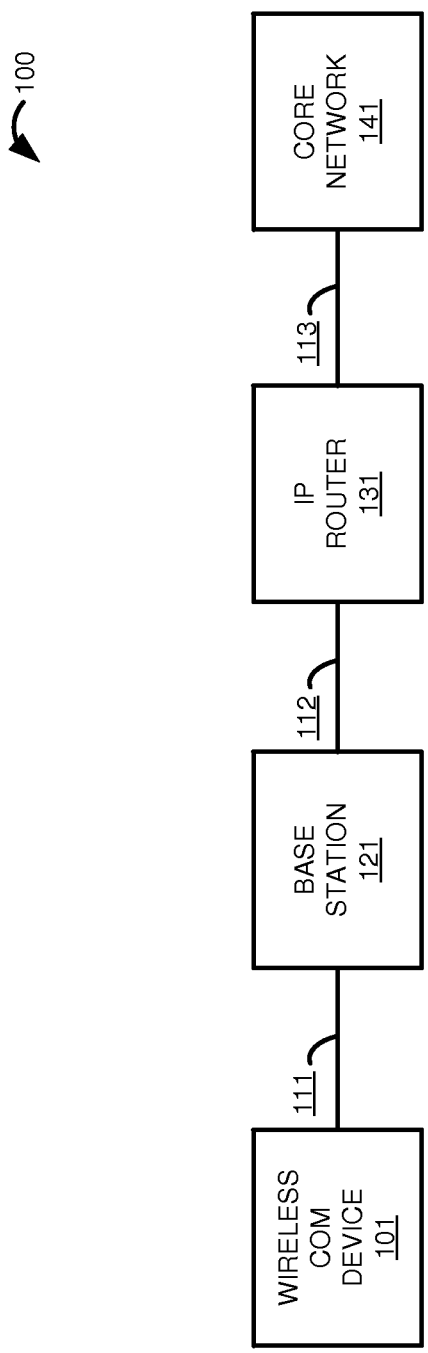
FIG. 1 illustrates a wireless communication system to provide call routing when connection to a core network is lost.

FIG. 1 illustrates wireless communication system 100 to provide call routing when connection to the core network is lost. Wireless communication system 100 includes wireless communication device 101, base station 121, Internet Protocol (IP) router 131, and core network 141. Wireless communication device 101 and base station 121 communicate over wireless link 111. Base station 121 and IP router 131 communicate over communication link 112. IP router 131 and core network 141 communicate over communication link 113. Although base station 121 and IP router 131 are shown separately, base station 121 and IP router 131 may be located at the same location in some examples. Wireless communication system 100 may include other components not shown for clarity.

Core network 141 may use wireless protocols such as Long Term Evolution (LTE), Evolution Data Optimized (EVDO), Code Division Multiple Access (CDMA), Global System for Mobile communications (GSM), High Speed Packet Access (HSPA), Wireless Fidelity (WIFI), Worldwide Interoperability for Microwave Access (WiMAX), and the like. IP router 131 may be any computer or machine with routing capabilities. For example, IP router 131 may be a server, virtual machine, virtual router, edge router, customer edge router, network router, machine with a virtual server/router, base station router, Cell Site Router (CSR), or an aggregation router. Examples of base station 121 include base stations, base stations transceivers, femtocell base stations, small cells, eNodeBs, and/or other wireless access nodes—including combinations thereof. Examples of wireless communication device 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

In operation, base station 121 wirelessly exchanges data packets associated with one or more communication sessions with one or more wireless communication devices. Examples of communication sessions include voice calls, video calls, emails, data exchanges, web page requests, streaming media, text messages, and/or other communication sessions—including combinations thereof.

Base station 121 transfers the data packets for delivery to IP router 131. IP router 131 scans the data packets to identify active users on base station 121. Scanning the data packets may comprise deep packet inspection. For instance, IP router 131 may inspect the headers of SIP messages. For example, IP router 131 may scan for LTE registrations, IMS registrations (i.e. SIP messages), call invites, call terminations, or another messages—including combinations thereof.

IP router 131 generates a database of the active users. For example, wireless communication device 101 transfers an LTE Radio Resource Control (RRC) message to attach to base station 121. In response to receiving the RRC message, base station 121 may transfer an S1AP message for delivery to core network 141. IP router 131 scans data packets for the S1AP message, identifies wireless communication device 101 as an active user, and adds wireless communication device 101 to an active user database. In another example, IP router may scan for SIP registrations, when signaling to establish the IMS bearer is exchanged. The database may comprise a routing table, database, or other data structure—including combinations thereof.

IP router 131 detects a loss of connection to core network 141 and determines which of the communication sessions can be maintained based on the database of active users. IP router 131 routes the data packets for the communication sessions that can be maintained back to base station 121 for delivery. For example, wireless communication device 101 is communicating with another wireless communication device also communicating over base station 121, when connection to core network 141 is lost, this communication session can be maintained through base station 121 without connection to core network 141.

Figure 2:
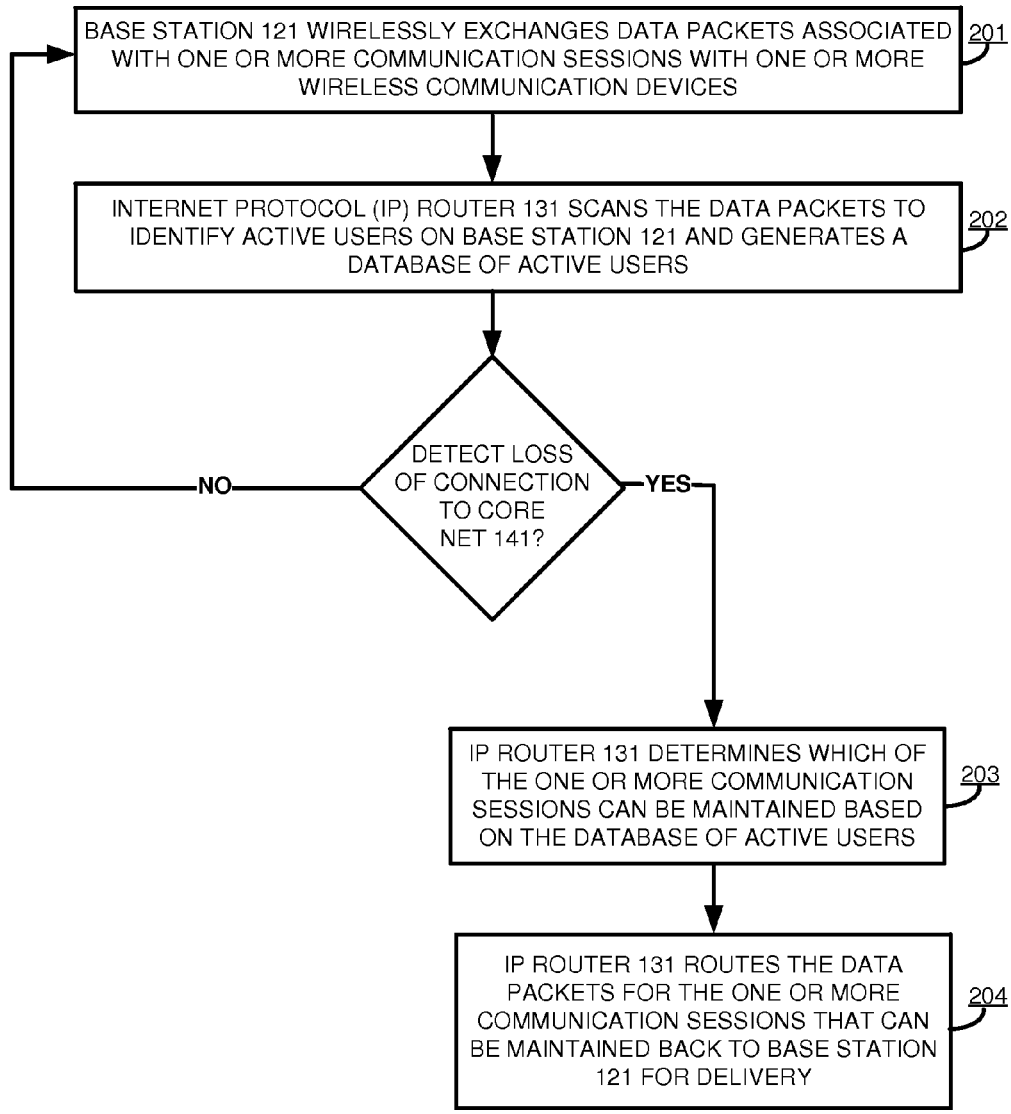
FIG. 2 illustrates the operation of the wireless communication system to provide call routing when connection to the core network is lost.

FIG. 2 illustrates the operation of wireless communication system 100 to provide call routing when connection to the core network is lost. Base station 121 wirelessly exchanges data packets associated with one or more communication sessions with one or more wireless communication devices (201). Base station 121 may transfer the data packets for delivery to IP router 131. IP router 131 scans the data packets to identify active users on base station 121 and generates a database of the active users (202). For example, IP router 131 may scan data packets for SIP invites, in order to identify active Voice over LTE (VoLTE) sessions.

In some examples, active users may be users engaged in active communication sessions. IP router 131 may track Internet Protocol (IP) address pairs. For instance, an IP address pair may comprise the IP address of the originating wireless communication device and the IP address of the communication session destination. In some instances, the communication session destination may be another wireless communication device registered to base station 121. In other examples, actives users may be wireless communication devices that are authorized and/or registered, but with no active communication sessions.

IP router 131 detects a loss of connection to core network 141 and determines the communication sessions that can be maintained based on the database of active users (203). In some examples, the connection is lost when the backhaul link to core network 141 is overloaded or experiencing heavy traffic causing delays. In other examples, core network 141 may be down. IP router 131 routes the data packets for the communication sessions that can be maintained back to base station 121 for delivery (204). In some examples, communication sessions comprise active communication sessions. In other examples, the communication sessions further comprise new communication sessions, initiated after loss of connection to core network 141 is detected. In some examples, base station 121 may be unaware that connection to core network 141 is lost.

Figure 3:
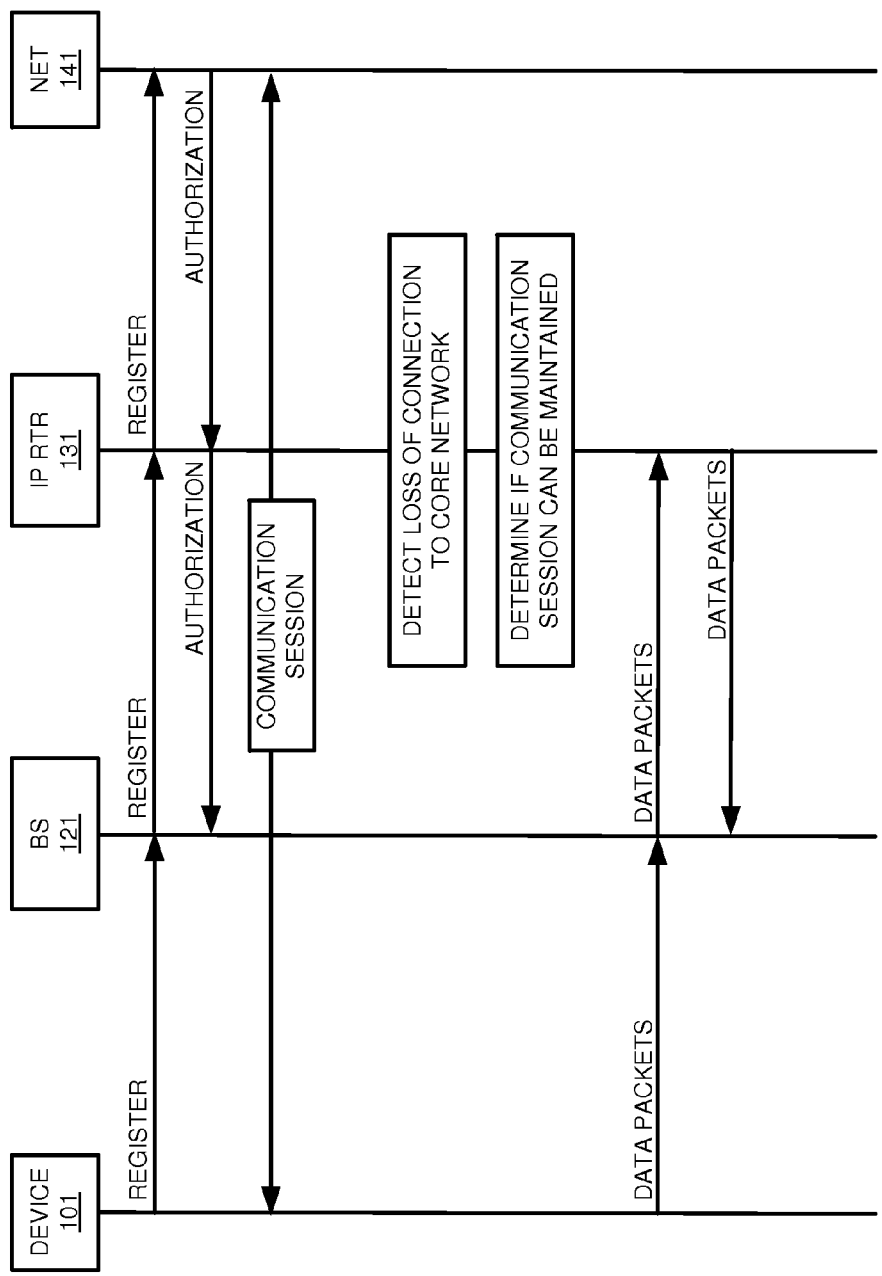
FIG. 3 illustrates the operation of the wireless communication system to provide call routing when connection to the core network is lost.

FIG. 3 illustrates the operation of wireless communication system 100 to provide call routing when connection to the core network is lost. Base station (BS) 121 wirelessly exchanges data packets associated with one or more communication sessions with one or more wireless communication devices. Base station 121 transfers the packets for delivery to IP router 131.

IP router (IP RTR) 131 scans the data packets to identify active users on base station 121. IP router 131 generates a database of the active users. IP router 131 detects a loss of connection to core network (NET) 141 and determines which of the communication sessions can be maintained based on the database of active users. IP router 131 routes the data packets for the communication sessions that can be maintained back to base station 121 for delivery. Although, not required, base station 121 may page non-active users in order to determine whether the users are within the coverage area of base station 121.

Figure 4:
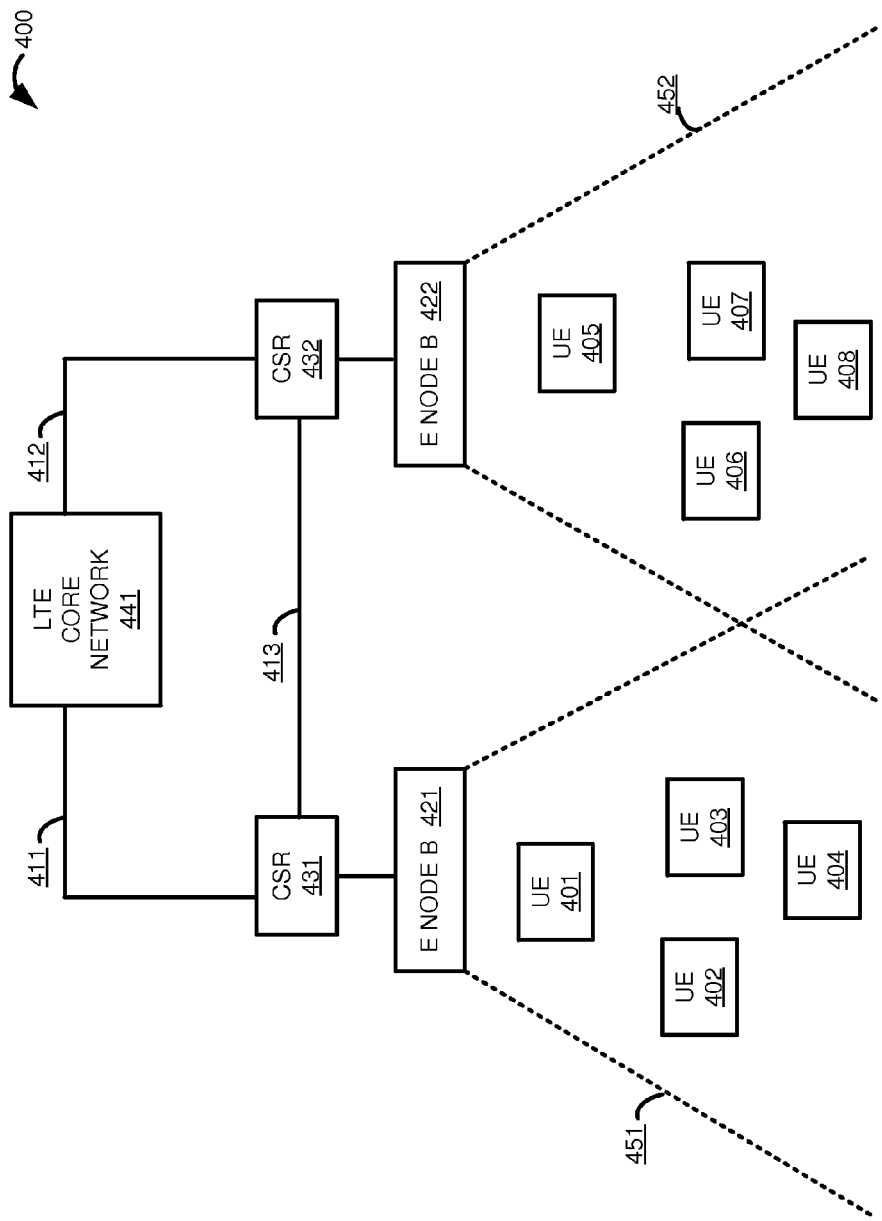
FIG. 4 illustrates a wireless communication system to provide call routing when connection to a core network is lost.

FIG. 4 illustrates wireless communication system 400 to provide call routing when connection to a core network is lost. Wireless communication system 400 includes User Equipment (UEs) 401-408, eNodeBs 421-422, Cell Site Routers (CSRs) 431-432, LTE core network 441, and communication links 411-413. ENodeB 421 provides wireless communication service over sector 451. ENodeB 422 provides wireless communication service over sector 452. Although shown as adjacent with overlapping coverage areas, there may be other sectors between wireless sector 451 and wireless sector 452. In some examples, sector 451 and sector 452 may not be adjacent. Although not shown for clarity, there may also be other communication means available to UEs 401-408 such as WIFI.

UEs 401-404 communicate with LTE core network 441 via eNodeB 421. UEs 405-408 communicate with LTE core network 441 via eNodeB 422. CSR 431 communicates with LTE core network 431 over communication link 411. CSR 432 communicates with LTE core network 431 over communication link 412. CSR 431 and CSR 432 communicate over communication link 413. Although not required, CSRS 431-432 may provide timing information to eNodeBs 421-422 after connection to LTE network 441 is lost. Wireless communication system 400 may include other components not shown for clarity.

In operation, eNodeB 421-422 wirelessly exchange data packets associated with one or more communication sessions. CSRs 431-432 scan the data packets to identify active users on eNodeBs 421-422, respectively. CSRs 431-432 generate a database of the active users. CSRs 431-432 detect a loss of connection to LTE core network 441. CSRs 431-432 exchange active user information. CSRs 431-432 determine which of the communication sessions can be maintained based on the database of active users. CSRs 431-432 route the data packets for the communication sessions that can be maintained back to eNodeBs 421-422, respectively, for delivery.

In some examples, CSRs 431-432 may also generate Call Detail Records (CDRs) for the communication sessions that are maintained, and transfer the CDRs for delivery to LTE network 441 once the connection is restored. Although not required, the CDRs may include destination and origination information, timestamp, duration, type of call, and/or other call information—including combinations thereof.

Figure 5:
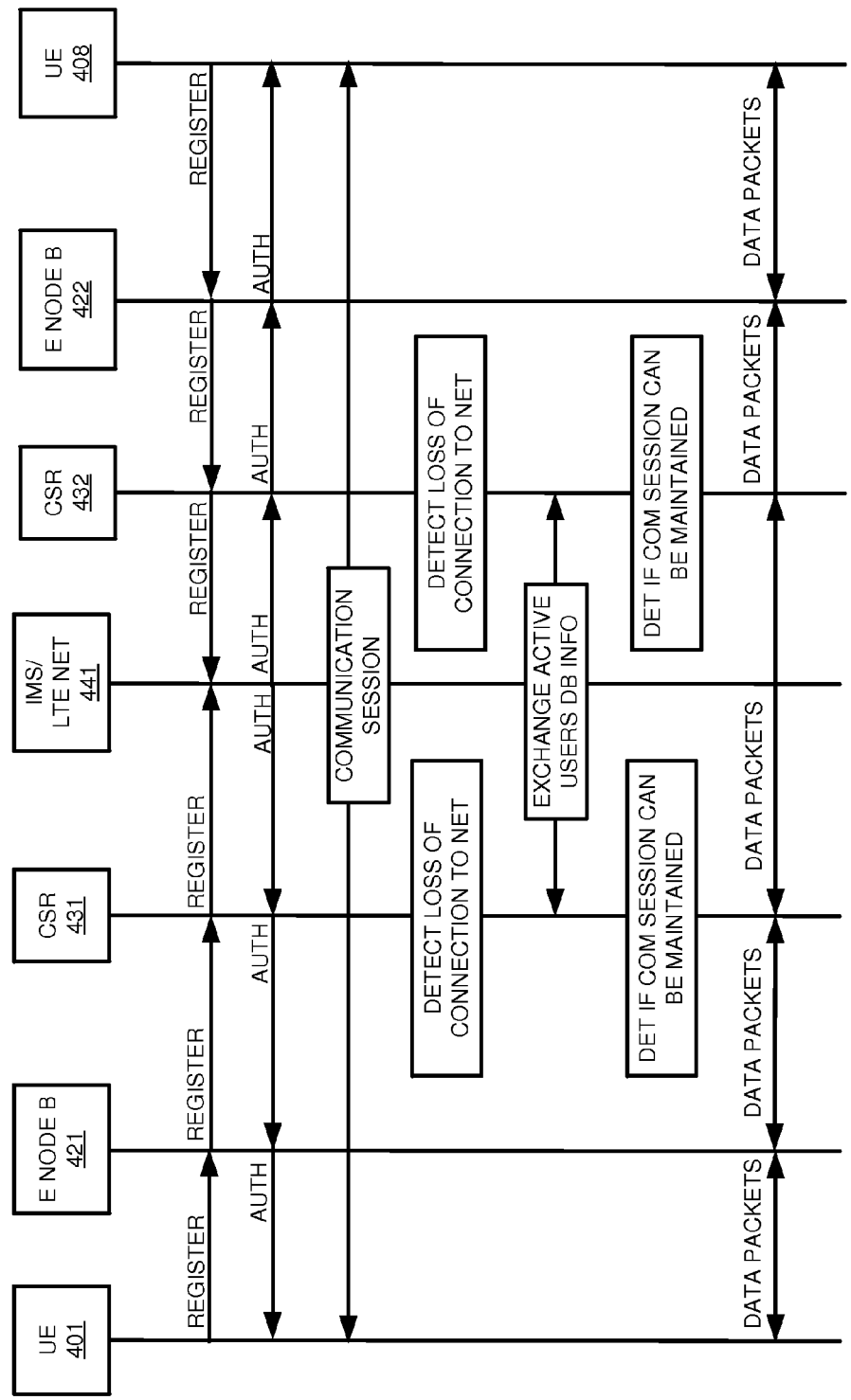
FIG. 5 illustrates the operation of the wireless communication system to provide call routing when connection to the core network is lost.

FIG. 5 illustrates the operation of wireless communication system 400 to provide call routing with connection to a core network is lost. ENodeBs 421-422 wirelessly exchange data packets associated with one or more communication sessions. ENodeBs 421-422 transfer the data packets for delivery to CSRs 431-432. CSRs 431-432 scan the data packets to identify active users on eNodeBs 421-422, respectively. CSRs 431-432 generate a database of the active users. CSRs 431-432 detect a loss of connection to LTE core network 441. CSRs 431-432 exchange active user information. CSRs 431-432 determine which of the communication sessions can be maintained. CSRs 431-432 route the data packets for the communication sessions that can be maintained back to eNodeBs 421-422, respectively, for delivery.

For example, UE 401 wirelessly exchanges data packets with eNodeB 421. ENodeB 421 transfers the data packets for delivery to CSR 431. CSR 431 scans the data packets to identify UE 401 as an active user on eNodeB 421. CSR 431 adds UE 401 to the database of the active users. CSR 431 detects a loss of connection to LTE core network 441. Similarly, UE 408 wirelessly exchanges data packets with eNodeB 422. ENodeB 422 transfers the data packets for delivery to CSR 432. CSR 432 scans the data packets to identify UE 408 as an active user on eNodeB 422. CSR 432 adds UE 408 to the database of the active users. In some examples, UE 401 and UE 408 are engaged in a voice call. In other examples, UE 401 and UE 408 may be exchanging text or Short Message Service (SMS) messages.

CSRs 431-432 detect a loss of connection to LTE core network 441. CSRs 431-432 exchange active user information to determine if the communication session between UE 401 and UE 408 can be maintained. Since the data packets for the communication session between UE 401 and UE 408 can be routed through CSRs 431-432 directly, without being routed through LTE network 441; the communication session between UE 401 and UE 408 can be maintained. The data packets associated with the communication session between UE 401 and UE 408 are routed through CSRs 431 and 432 directly, independently of LTE network 441.

In some examples, an aggregate database of active users may be generated. This aggregate database of active users may be stored in each CSR or may even be stored in an aggregate router that remains connected to each CSR after connection to the core network is lost. In this example, the aggregate database may be used to determine whether the communication session can be maintained.

In some examples, CSRS 431-432 may also generate Call Detail Records (CDRs) for the communication sessions that are maintained, and transfer the CDRs for delivery to LTE network 441 once the connection is restored.

Figure 6:
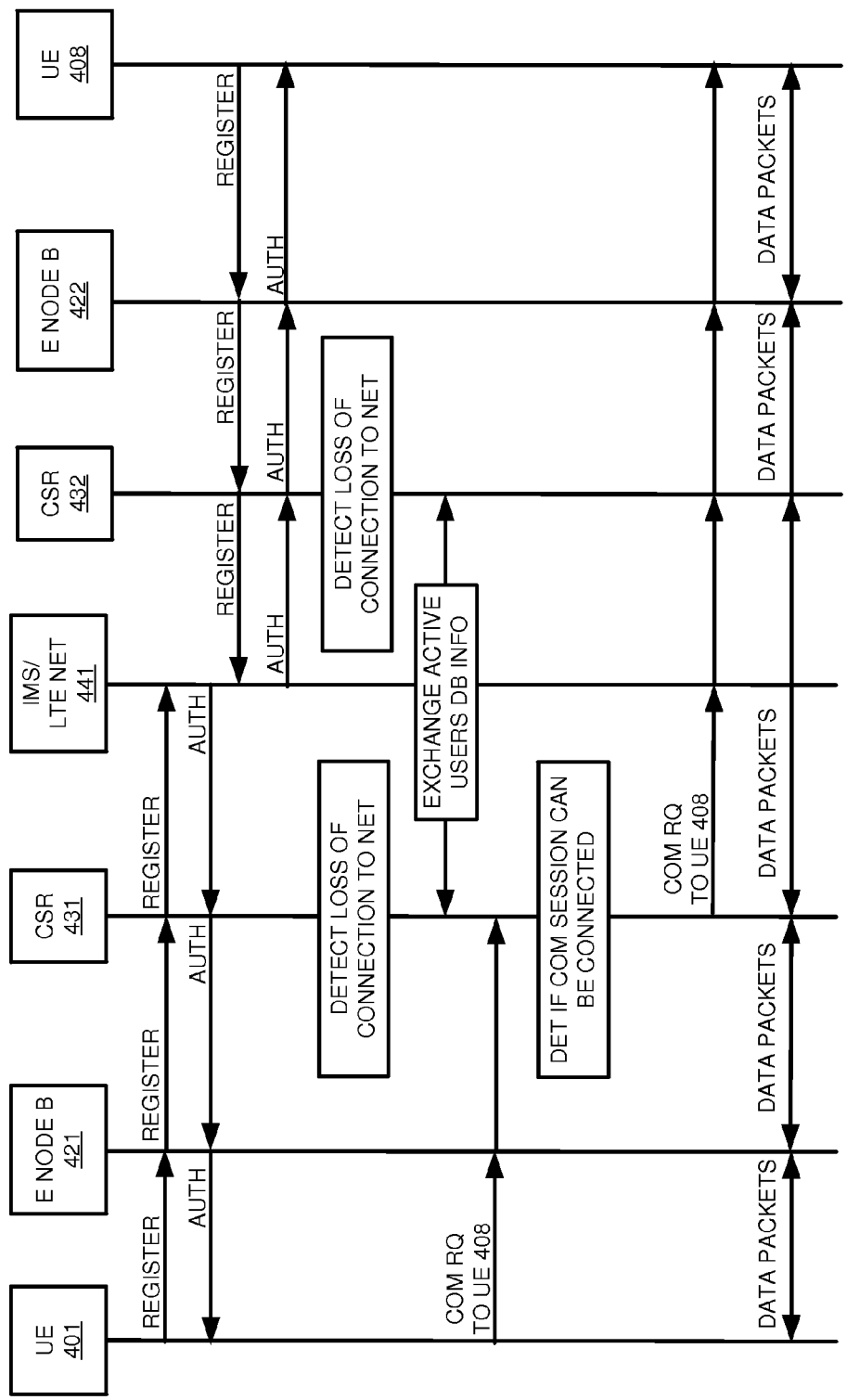
FIG. 6 illustrates the operation of the wireless communication system to provide call routing when connection to the core network is lost.

FIG. 6 illustrates the operation of wireless communication system 400 to provide call routing with connection to a core network is lost. UE 401 registers with eNodeB 421. For example, UE 401 may transfer an LTE RRC message to eNodeB 421. ENodeB 421 transfers a S1MME attach message for delivery to CSR 431. CSR 431 receives the authorization message back from LTE network 441 and transfers the authorization message for delivery to eNodeB 421. CSR 431 scans the data packets associated with the LTE registration and authorization of UE 401 to identify UE 401. CSR 431 generates a database entry for UE 401, indicating that UE 401 is an authorized wireless communication device.

UE 408 registers with eNodeB 422. Although the registration and authorization of UE 408 are shown as occurring subsequent to the registration and authorization of UE 401, the registration and/or authorization of UE 408 could occur before or simultaneously with the registration and authorization of UE 401. CSR 432 scans the data packets associated with the registration and authorization of UE 408 to identify UE 408. CSR 421 generates a database entry for UE 408, indicating that UE 408 is an authorized wireless communication device.

CSRs 431-432 detect a loss of connection to LTE core network 441. After connection to LTE network 441 is lost, UE 401 attempts to originate a call to 408. CSR 432 and CSR 432 communicate over communication link 413 to exchange active user information to determine if the communication request from UE 401 to UE 408 can be completed. In some examples, communication link 413 comprises an LTE X2 link.

If the connection to LTE network 441 was not lost, UE 401 may repeat the registration and/or authorization process. However, since connection to LTE network 441 is lost, UE 401 cannot be authorized and registered. CSR 431 searches the database of active users and determines that UE 401 was previously authorized. In some examples, UE 401 may be deleted from the database of active users after a certain amount of time. For instance, if it has been twenty-four hours since UE 401 was authorized. Similarly, CSR 432 searches the database of active users and determines that UE 408 was previously authorized. CSR 431 and CSR 432 transfer the data packets for the communication session between UE 401 and UE 408, directly to each other without routing the data packets through LTE network 441.

Advantageously, CSRs 431-432 maintain and establish communication sessions between UEs 401-408 without contemporaneous support from LTE network 441. Despite a loss of LTE network 441, CSRs 431-432 still apply previous network authorizations to protect network resources for authorized users. For example, CSRs 431-432 may require both a successful LTE registration and a successful IMS registration within the previous 30 days before allocating communication resources to UEs 401-408 when LTE network 441 is down. By tracking and subsequently reporting this authorized network usage to LTE network 441, CSRs 431-432 further help overcome gaps in core connectivity.

FIG. 7 illustrates IP router 700 to provide call routing when connection to a core network is lost. IP router 700 is an example of IP router 131 and CSRs 431-432, although IP router 131 and CSRs 431-432 may use alternative configurations. IP router 700 could be a discrete system, a distributed system, and/or could be integrated into other systems.

IP router 700 comprises communication transceivers 701 and processing system 703. Processing system 703 comprises processor circuitry 711 and memory 712 that stores operating software 713 and database 718. Software 713 includes scanning module 714, routing module 715, tracking module 716, and control module 717. Processing system 703 is linked to communication transceivers 701. IP router 700 may include other well-known components that are not shown for clarity such as, servers, computer systems, databases, and power systems.

Communication transceivers 701 comprise a physical communication port, signal processing circuitry, software, and/or some other communication components. Communication transceivers 701 may use various protocols, such as IP, TDM, Ethernet, wireless, or some other network communication format—including combinations thereof. Communication transceivers 701 exchange signaling and other control data with communication nodes as described herein.

Processor circuitry 711 comprises microprocessor and other circuitry that retrieves and executes operating software 713 from memory 712. Memory 712 comprises a non-transitory computer-readable storage medium, such as a disk drive, flash drive, data storage circuitry, or some other memory apparatus. Memory system 712 could be a single device or be distributed across multiple devices. Processor circuitry 711 is typically mounted on one or more circuit boards that may also hold memory 712 and portions of communication transceivers 701.

Operating software 713 comprises computer programs, firmware, or some other form of computer-readable processing instructions. Operating software 713 may include an operating system, utilities, drivers, network interfaces, applications, or some other type of software. When executed by processor circuitry 711, software 713 directs processing system 703 to operate IP router 700 as described herein. In particular, scanning module 714 directs processing system 703 to scan the data packets to identify active users and generate a database of active users. Routing module 715 directs processing system 703 to route data packets for the communication sessions. In some examples, routing module 715 may perform functions normally performed in the core network/IP multimedia subsystem (IMS), when connection to the core network is lost. Tracking module 716 directs processing system 703 to track SIP invites and registrations. Control module 717 directs processing system 703 to monitor the core network and detect a loss of connection to the core network. Database 718 comprises data structures that list active users.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Base station 121 comprises RF communication circuitry and an antenna. The RF communication circuitry typically includes an amplifier, filter, RF modulator, and signal processing circuitry. Base station 121 may also comprise a router, server, memory device, software, processing circuitry, cabling, power supply, network communication interface, structural support, or some other communication apparatus. Base station 121 could be a wireless access node, base station, eNodeB, Internet access node, telephony service node, wireless data access point, or some other wireless communication system—including combinations thereof.

IP router 131 comprises a computer system and communication interface. IP router 131 may also include other components such as a server, data storage system, and power supply. IP router 131 may reside in a single device or may be distributed across multiple devices. IP router 131 is shown external to base station 121, but IP router 131 could be integrated within the components of base station 121. IP router 131 could be a cell site router, mobile switching center, network gateway system, Internet access node, application server, service node, or some other communication system—including combinations thereof.

Core network 141 comprises network elements that provide communications services to wireless communication device 101 through base station 121. Core network 141 may comprise switches, base stations, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112-113 use metal, glass, air, space, or some other material as the transport media. Communication links 112-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112-113 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to provide call routing when connection to a core network is lost, the method comprising:

a first base station wirelessly exchanging data packets associated with one or more communication sessions with one or more wireless communication devices;

a first Internet Protocol (IP) router scanning the data packets to identify active users on the first base station and generating a first database of the active users;

the first IP router detecting a loss of connection to the core network;

the first IP router determining which of the one or more communication sessions can be maintained based on the first database of the active users; and the first IP router routing the data packets for the one or more communication sessions that can be maintained back to the first base station for delivery.

2. The method of claim 1 further comprising:
a second base station wirelessly exchanging data packets associated with one or more communication sessions with one or more wireless communication devices;
a second Internet Protocol (IP) router scanning the data packets to identify active users on the second base station and generating a second database of the active users;
the second base station detecting a loss of connection to the core network;
the second IP router determining which of the one or more communication sessions can be maintained based on the second database of the active users; and
the second IP router routing the data packets for the one or more communication sessions that can be maintained to the second base station for delivery.

3. The method of claim 2 further comprising:
a first wireless communication device active on the first base station communicating with a second wireless communication device active on the second base station; and
wherein determining which of the one or more communication sessions can be maintained comprises the first IP router communicating with the second IP router.

4. The method of claim 2 wherein a coverage area of the first base station and a coverage area of the second base station are adjacent.

5. The method of claim 1 further comprising:
after detecting the loss of connection to the core network the first base station receiving a new SIP invite;
the first IP router determining if the new SIP invite can be delivered based on the database of the active users; and
if the new SIP invite can be delivered, then routing the new SIP invite back to the first base station for delivery.

6. The method of claim 1 further comprising the first base station paging non-active users.

7. The method of claim 1 further comprising:
the first base station generating Call Detail Records (CDRs) for the one or more communication sessions that are maintained; and
the first base station transferring the CDRs to the core network once connection to the core network is re-established.

8. The method of claim 1 wherein the first base station is a Long Term Evolution (LTE) eNodeB.

9. The method of claim 1 wherein the first IP router is a Cell Site Router (CSR).

10. The method of claim 1 wherein the loss of connection to the core network is caused by a failed backhaul link to the core network.

11. A wireless communication system to provide call routing when connection to a core network is lost, the wireless communication system comprising:
a first base station configured to wirelessly exchange data packets associated with one or more communication sessions with one or more wireless communication devices;
a first Internet Protocol (IP) router configured to scan the data packets to identify active users on the first base station and generate a first database of the active users;
the first IP router configured to detect a loss of connection to the core network;

the first IP router configured to determine which of the one or more communication sessions can be maintained based on the first database of the active users; and
the first IP router configured to route the data packets for the one or more communication sessions that can be maintained back to the first base station for delivery.

12. The wireless communication system of claim 11 further comprising:
a second base station configured to wirelessly exchange data packets associated with one or more communication sessions with one or more wireless communication devices;
a second IP router configured to scan the data packets to identify active users on the second base station and generate a second database of the active users;
the second IP router configured to detect a loss of connection to the core network;
the second IP router configured to determine which of the one or more communication sessions can be maintained based on the second database of the active users; and
the second IP router configured to route the data packets for the one or more communication sessions that can be maintained to the second base station for delivery.

13. The wireless communication system of claim 12 further comprising:
a communication session between a first wireless communication device active on the first base station and a second wireless communication device active on the second base station; and
wherein the first IP router is configured to communicate with the second IP router to determine whether the communication session between the first wireless communication device and the second wireless communication device can be maintained.

14. The wireless communication system of claim 12 wherein a coverage area of the first base station and a coverage area of the second base station are adjacent.

15. The wireless communication system of claim 11 further comprising:
the first IP router configured to receive a new SIP invite;
the first IP router configured to determine if the new SIP invite can be delivered based on the first database of the active users; and
if the new SIP invite can be delivered, then the first IP router configured to route the new SIP invite back to the first base station for delivery.

16. The wireless communication system of claim 11 further comprising the first base station configured to page non-active users.

17. The wireless communication system of claim 11 further comprising:
the first base station configured to generate Call Detail Records (CDRs) for the one or more communication sessions that are maintained; and
the first base station configured to transfer the CDRs once connection to the core network is re-established.

18. The wireless communication system of claim 11 wherein the first base station is a Long Term Evolution (LTE) eNodeB.

19. The wireless communication system of claim 11 wherein the first IP router is a Cell Site Router (CSR).

20. The wireless communication system of claim 11 wherein the loss of connection to the core network is caused by a failed backhaul link the core network.

* * * * *